(12) United States Patent
Lee et al.

(10) Patent No.: US 10,759,694 B2
(45) Date of Patent: Sep. 1, 2020

(54) RIGID SUBSTRATE, TOUCH PANEL, AND PROCESSING METHOD OF RIGID SUBSTRATE

(71) Applicant: TPK Holding Co., Ltd., Grand Cayman (KY)

(72) Inventors: Chia-Huang Lee, Taichung (TW); Ming-Kung Wu, Taichung (TW); Heng-Chia Kuo, Taichung (TW)

(73) Assignee: TPK Holding Co., Ltd., Grand Cayman (KY)

( * ) Notice: Subject to any disclaimer, the term of this patent is extended or adjusted under 35 U.S.C. 154(b) by 923 days.

(21) Appl. No.: 14/727,813

(22) Filed: Jun. 1, 2015

(65) Prior Publication Data

US 2015/0259245 A1  Sep. 17, 2015
US 2018/0134616 A9  May 17, 2018

Related U.S. Application Data

(62) Division of application No. 13/905,139, filed on May 30, 2013, now abandoned.

(30) Foreign Application Priority Data

May 30, 2012 (TW) .............................. 101119366 A

(51) Int. Cl.
| | |
|---|---|
| *C03C 21/00* | (2006.01) |
| *H01H 9/02* | (2006.01) |
| *H01H 11/00* | (2006.01) |
| *G06F 3/044* | (2006.01) |
| *C03C 15/02* | (2006.01) |
| *C03C 15/00* | (2006.01) |
| *C03C 19/00* | (2006.01) |

(Continued)

(52) U.S. Cl.
CPC .............. *C03C 21/002* (2013.01); *C03C 15/00* (2013.01); *C03C 15/02* (2013.01); *C03C 19/00* (2013.01); *G06F 3/044* (2013.01); *G06F 3/047* (2013.01); *G09G 5/003* (2013.01); *H01H 9/02* (2013.01); *H01H 11/00* (2013.01); *C03C 2204/08* (2013.01); *G06F 2203/04103* (2013.01); *G09G 2300/0426* (2013.01); *Y10T 428/239* (2015.01)

(58) Field of Classification Search
CPC ....... C03C 21/002; C03C 19/00; C03C 15/00; C03C 15/02; C03C 2204/08; G09G 5/003; G09G 2300/0426; G06F 3/047; G06F 3/044; G06F 2203/04103; H01H 11/00; H01H 9/02; Y10T 428/239
See application file for complete search history.

(56) References Cited

U.S. PATENT DOCUMENTS

| | | | |
|---|---|---|---|
| 3,711,263 A | * | 1/1973 | Leger |
| 2008/0292844 A1 | * | 11/2008 | Sabia et al. |
| 2011/0003619 A1 | * | 1/2011 | Fujii |

(Continued)

*Primary Examiner* — Anita K Alanko
(74) *Attorney, Agent, or Firm* — Cooper Legal Group, LLC

(57) ABSTRACT

A rigid substrate, a touch panel including the rigid substrate and a processing method of the rigid substrate are provided. The rigid substrate includes an ion strengthened surface layer completely covering the entire outer surface thereof. The rigid substrate has an etched wall, wherein an average depth of the ion strengthened surface layer on the etched wall is substantially equivalent to an average depth of the ion strengthened surface layer outside of the etched wall.

20 Claims, 7 Drawing Sheets

(51) Int. Cl.
*G06F 3/047* (2006.01)
*G09G 5/00* (2006.01)

(56) References Cited

U.S. PATENT DOCUMENTS

| | | | |
|---|---|---|---|
| 2011/0019123 A1* | 1/2011 | Prest et al. | |
| 2012/0052302 A1* | 3/2012 | Matusick et al. | |
| 2012/0083401 A1* | 4/2012 | Koyama et al. | |
| 2012/0236477 A1* | 9/2012 | Weber | C03C 21/003 361/679.01 |
| 2013/0005222 A1* | 1/2013 | Brown | B24B 9/102 451/44 |
| 2013/0101798 A1* | 4/2013 | Hashimoto | |
| 2013/0273324 A1* | 10/2013 | Moll | C03C 23/0025 428/161 |

\* cited by examiner 220   210   102

200

RIGID SUBSTRATE, TOUCH PANEL, AND PROCESSING METHOD OF RIGID SUBSTRATE

CROSS-REFERENCE TO RALATED APPLICATIONS

This application is a divisional of Prior application Ser. No. 13/905,139, filed on May 30, 2013, which claims the benefit of Taiwan application serial no. 101119366, filed on May 30, 2012 by the present inventor, the disclosure of which are incorporated herein by reference.

BACKGROUND OF THE INVENTION

Field of the Invention

The invention relates to a substrate, a touch panel, and a processing method of the substrate. More particularly, the invention relates to a rigid substrate, a touch panel including the rigid substrate, and a processing method of the rigid substrate.

Description of the Related Art

As probabilities for users to be in direct contact with panel devices significantly increase, possibilities of damaging the panel devices due to lack of mechanical strength may also increase. Therefore, the mechanical strength of the panel devices has become an important factor in indicating a durability of electronic products. Currently, a strengthened substrate (e.g., a strengthened glass plate or the industrial so-called cover plate) has already been utilized to manufacture the panel device so as to enhance the mechanical strength thereof. Namely, electronic devices with touch or display functionalities may be manufactured on the strengthened substrate so as to enhance the overall mechanical strength of the panel devices.

Nevertheless, the strengthened substrate generally has to undergo a process of cutting and forming so as to comply with a designed size of a product, a plurality of cracks with different sizes are produced at cut-off edges during the process of cutting and forming, and the cracks with different sizes often become stress concentration areas. Therefore, the aforementioned substrate still has some limits as in enhancing the mechanical strength of the panel devices; and especially, the substrate often starts to crack from the cut-off edges.

SUMMARY OF THE INVENTION

The invention provides a rigid substrate having an etched wall with uniformed cracks, and thus is capable of providing an ideal mechanical strength.

The invention provides a touch panel utilizing a rigid substrate with ideal mechanical strength to provide bearing function, and thus has favorable quality and durability.

The invention provides a processing method of a rigid substrate capable of effectively avoiding the stress concentration phenomenon on the wall of the rigid substrate after cutting.

The invention provides a rigid substrate including an ion strengthened surface layer completely covering the entire outer surface of the rigid substrate. The rigid substrate has an etched wall, wherein an average depth of the ion strengthened surface layer on the etched wall is substantially equivalent to an average depth of the ion strengthened surface layer outside of the etched wall.

The invention further provides a touch panel including a rigid substrate and a touch device. The rigid substrate includes an ion strengthened surface layer completely covering the entire outer surface of the rigid substrate. The rigid substrate has an etched wall, wherein an average depth of the ion strengthened surface layer on the etched wall is substantially equivalent to an average depth of the ion strengthened surface layer outside of the etched wall. The touch device is disposed on the rigid substrate.

According to an embodiment, an average surface roughness of the etched wall ranges from 0.03 μm to 0.8 μm.

According to an embodiment, the etched wall includes a plurality of cracks, and aperture sizes of the cracks range from 3 μm to 15 μm.

According to an embodiment, the etched wall includes a plurality of cracks, and the average depth of the ion strengthened surface layer is substantially greater than an average depth of the cracks.

According to an embodiment, the touch panel further includes a decoration pattern layer disposed on the rigid substrate, and the decoration pattern layer is substantially located at the periphery of the touch device.

The invention further provides a processing method of a rigid substrate. A mechanical or a material removal processing is performed on a rigid motherboard to form a rigid substrate parison, so that the rigid substrate parison has a cutting wall. An etching process is performed to the cutting wall so that the cutting wall becomes an etched wall. An ion strengthening process is performed to the rigid substrate parison so that the entire outer surface of the rigid substrate completely including an ion strengthened surface layer is formed, wherein an average depth of the ion strengthened surface layer on the etched wall is substantially equivalent to an average depth of the ion strengthened surface layer outside of the etched wall.

According to an embodiment, the steps of performing the etching process on the cutting wall includes attaching a resistant layer onto the rigid substrate and enabling the resistant layer to expose a part of the cutting wall; and contacting the exposed part of the etched wall with an etchant. Specifically, a material of the rigid substrate is glass, and a material of the etchant is hydrofluoric acid. Moreover, the resistant layer is removed, for example, before the ion strengthening process is performed.

According to an embodiment, an average surface roughness of the cutting wall ranges from 1.0 μm to 3 μm, and an average surface roughness of the etched wall ranges from 0.03 μm to 0.8 μm.

According to an embodiment, the step of performing the ion strengthening process includes wholly contacting the rigid substrate with an ion strengthening liquid.

According to an embodiment, the mechanical or the material removal processing includes at least one of cutting, grinding, hole boring, chamfering, patterned etching, and polishing process.

According to an embodiment, the etching process is performed with a dry etching medium or a wet etching medium, wherein the dry etching medium includes a fluorine-containing gas or a plasma, and the wet etching medium includes at least a hydrofluoric acid or a fluorine-containing solvent.

According to the foregoing, the invention provides a processing method to perform etching on the cutting wall of the rigid substrate which has been subjected to the mechanical or material removal processing, so as to form the etched wall. The sizes of the cracks on the etched wall are less than the sizes of the cracks on the cutting wall before the etching, and the average surface roughness of the etched wall is smaller than the cutting wall before the etching. Therefore, the etched wall, relative to the cutting wall, is less likely to produce a stress concentration phenomenon at specific areas. Consequently, the ion strengthened etched wall may effectively enhance the mechanical strength of the rigid substrate, and thus enables the touch panel including the rigid substrate to have an ideal quality and durability.

Furthermore, because the qualities of the preceding mechanical or material removal processing are varied, the resulting depths of the cracks are inconsistent, and thus an achievable effect after being ion strengthened is influenced. However, in the embodiments, a chemical strengthening process is performed after the mechanical processed rigid substrate parison is being etched, so that the cracks may be substantially covering by the ion strengthened surface layer. Herein, a corresponding compressive stress distribution layer may be derived from the ion strengthened surface layer, and a compressive stress distribution layer may restrain the enlargement of the cracks on the glass surface so as to enhance the strength of the glass undergoing damage, and thus enables a much stable product strength.

Apart from the above, viewing from another perspective, since the depths of the cracks have been uniformed by etching in advance; therefore, the ion strengthened surface layer are able to cover the cracks without requiring a stringent process condition of the subsequent overall chemical strengthening, for example: a processing time may be relatively short, or so forth.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE EMBODIMENTS

Figure 1:
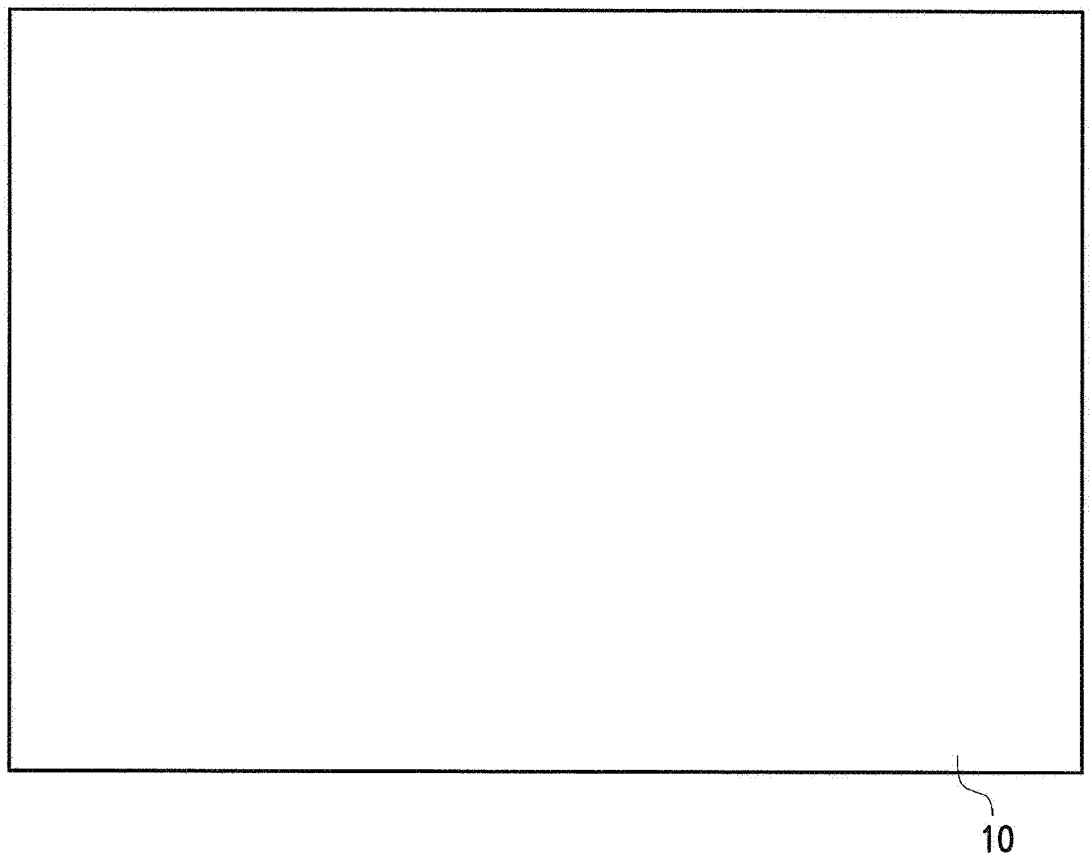
FIG. 1 to FIG. 4 schematically illustrate a process flow of a processing method of a rigid substrate according an embodiment.

It is noted that a depth of an ion strengthened surface layer of a glass in embodiment of the invention is referring to an average depth of potassium ions diffusing from the outer surface into the interior of the glass, and a better definition is referring to an average value of maximum diffusion depths of the potassium ion when a plurality of areas are divided out on the entire outer surface of the glass. The depth of the ion strengthened surface layer generally may be obtained by utilizing an instrument to detect whether the potassium ions are present. Since even under a same manufacturing process the diffusion depths of the ions would still vary, the invention adopts the average value of the diffusion depths as a standard for determining the depth of the ion strengthened surface layer.

Namely, in an embodiment, the depth of the ion strengthened surface layer may be defined as a value obtained from averaging the corresponding measured depths of a plurality of measuring points on the outer surface of the glass, wherein the concentrations of the potassium ions (K+) is measure from the outer surface towards the interior of the glass at the measuring points to obtain the corresponding measured depths. Generally, potassium ion distribution is highest on the outer surface of a substrate, and then gradually decreasing to zero or to a background value as towards the interior. Thus, the measured depth of each measuring point is substantially a distance from the outer surface of the glass to a location where the potassium ion concentration is gradually decreased to zero or the background value, wherein the background value is referring to an ion concentration of a raw material when the glass is manufactured.

For example, when the potassium ions are initially presented in the raw material of the glass, the potassium ion concentration of the raw material may be defined as the background value. In other words, since the ion strengthened surface layer is defined by the depths of exchanged ions (e.g., potassium ions) entering into the glass through an exchange/a diffusion mechanism, a concentration distribution of the exchanged ions would gradually decrease from the outer surface of a glass substrate towards to zero or the background value; and therefore, the presence of the ion strengthened surface layer may be determined through utilizing the instrument to detect the concentration of the exchanged ions. Moreover, the average depth may be the average value of the depths of the ion strengthened surface layer at a plurality of measuring points. Favourably, the average depth is defined by the average value of maximum diffusion depths of the exchanged ions in each measuring area within the glass.

In practical, ion strengthened surface layers with slightly different depths may be formed by a same ion strengthening process, and thus the average value of the depths of the ion strengthened surface layers may be obtained through detecting the diffusion depths of the exchanged ions at several different locations. For example, five different location points on the strengthened glass substrate are chosen, the diffusion depths of potassium ions are detected by the instrument, the five measured values are averaged to obtain an average value, and this average value represents an average depth T or d of the entire outer surface of the ion strengthened surface layer. Moreover, the ion exchange behavior of exchanging the potassium ions with the sodium ions is only an example for illustration purpose, the invention is not limited thereto, and other ion exchange behavior capable of producing a strength enhancement effect may also be applied to every embodiment of the invention. Furthermore, a material of the glass is not particularly limited, such that the material may include, for example, sodium-calcium-silicate glass and aluminosilicate glass.

FIG. 1 to FIG. 4 schematically illustrate a process flow of a processing method of a rigid substrate according an embodiment. Referring to FIG. 1, a rigid motherboard 10 is provided. Specifically, a material of the rigid motherboard 10 is glass, such as a soda-lime glass, a boro-silicate glass, an alumo-silicate glass, and so forth. Nevertheless, the material of the rigid motherboard 10 is not particularly limited to the ones mentioned above; other glass plate material capable of being utilized as a bearing in a panel device may be processed with the following disclosed processing method.

Figure 2:
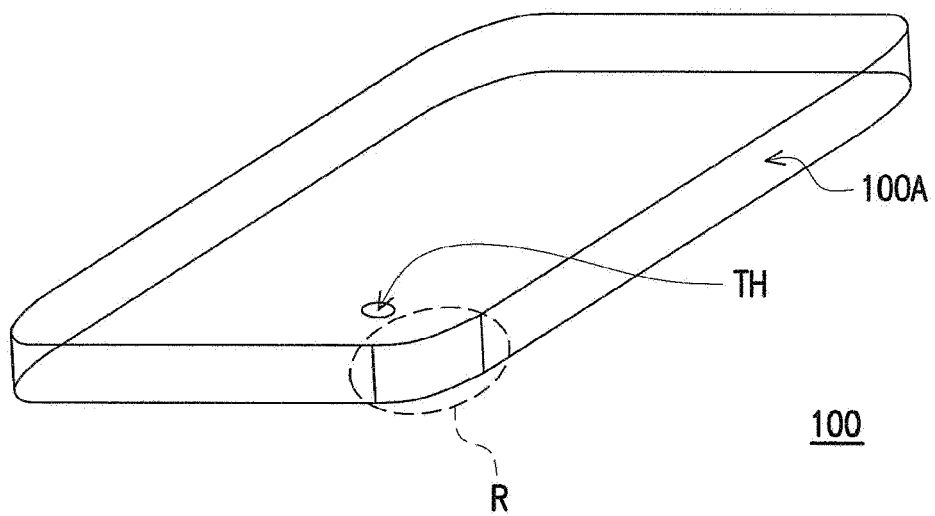

Next, a mechanical or a material removal processing is performed to pattern the rigid motherboard 10 in FIG. 1 into at least one rigid substrate parison 100 with a desired appearance, as shown in FIG. 2. In an embodiment, the rigid motherboard 10 may be cut into at least one rigid substrate parisons 100. Namely, the number of the rigid substrate parison 100 cut-off from the rigid motherboard 10 during the mechanical or a material removal processing such as the cutting process is not particularly limited herein. Thus, FIG. 2 illustrates only one rigid substrate parison 100 for the purpose of simplifying the description.

Moreover, the mechanical or the material removal processing may include at least one step of a cutting step, a grinding step, a hole boring step, a chamfering step, a patterned etching step, and a polishing step. Therefore, the rigid substrate parison 100 after cut-off, in addition to having a desired size, may also have a grinded rounding R, so that when the rigid substrate parison 100 is applied in a product, the aesthetic appearance of the product may be enhanced, and users are protected from being scratched by a sharp corner of the product. In addition, the rigid substrate parison 100 after cut-off, according to the design requirement, may be further formed with a through hole TH through the hole boring step, and the through hole TH may be utilized as an earphone hole, a microphone hole or a decorative hole in an electronic product.

Figure 12:
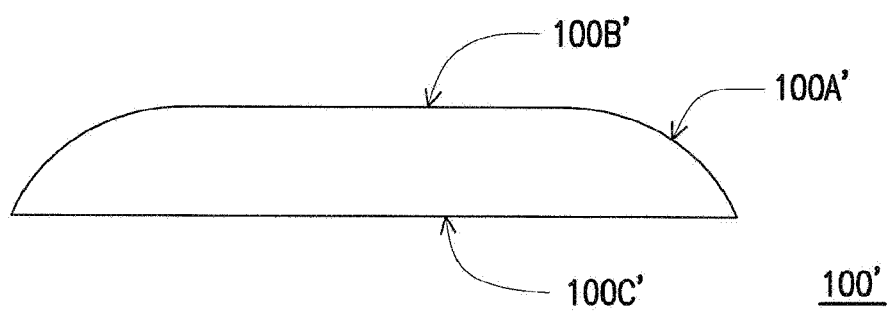
FIG. 12 schematically illustrates a cross-sectional diagram of a mechanical or material removal processed rigid substrate parison according to another embodiment.

Certainly, the aforementioned structure is an exemplary illustration, and the invention is not limited thereto. In other embodiment, the rigid substrate parison 100 may selectively has a sharp turning corner. Evermore, in another embodiment, as a cross-sectional diagram of a mechanical or material removal processed rigid substrate parison schematically illustrated in FIG. 12, a rigid substrate parison 100' may have an arc-shaped cutting wall 100A'. Now, the rigid substrate parison 100' has a substantially planar upper surface 100W, a substantially planar bottom surface 100C', wherein the arc-shaped cutting wall 100A' is connected between the upper surface 100B' and the lower surface 100C'. Certainly, the aforementioned design is only an example used for the purpose of illustration, in other embodiments, the upper surface 100B' may also have an arc-shaped appearance.

Noteworthy, in the process of mechanical or material removal processing, such as the cutting step, the grinding step, the hole boring step, the chamfering step, the patterned etching step, and the polishing step, the cutting wall 100A of the rigid substrate parison 100 is repeatedly under impact (impact of cutting tools, impact of grinding particles, erosion of an etchant or impact of polishing particles). Hence, the cutting wall 100A substantially has a plurality of cracks with different sizes and poor regularities. The cracks extend from the impacted outer surface towards the interior, and often result in stress concentration areas during the subsequent manufacturing process or using process. Specifically, the poorer the regularity of the cracks, the easier for the stress to be concentrated in certain particular area. Consequently, the rigid substrate parison 100 after cut-off even though has the required appearance, but still has no ideal mechanical strength.

Therefore, the present embodiment provides a method to further performs other processing procedures on the rigid substrate parison 100. For example, referring to FIG. 3, the processing method of the present embodiment further includes to attaches a resist film 20 on the rigid substrate parison 100, and enables the resist film 20 to expose the cutting wall 100A and a portion adjacent to the cutting wall 100A. Herein, since the through hole TH is manufactured through the mechanical or material removal processing, a wall that defines the through hole TH can also have the property similar to the cutting wall 100A and the resist film 20 can be further designed with an opening 20A for exposing the through hole TH. Next, an etching process is performed to the cutting wall 100A exposed by the resist film 20 and the wall that defines the through hole TH.

In an embodiment, the etching process may include contacting the rigid substrate parison 100 with a dry etching medium or a wet etching medium, wherein the dry etching medium includes a fluorine-containing gas or a plasma, and the wet etching medium includes at least a hydrofluoric acid or a fluorine-containing solvent. Herein, the material of the rigid substrate parison 100 is glass, so that the etching medium of the choice may be the hydrofluoric acid or other material capable of eroding the glass.

Figure 4:
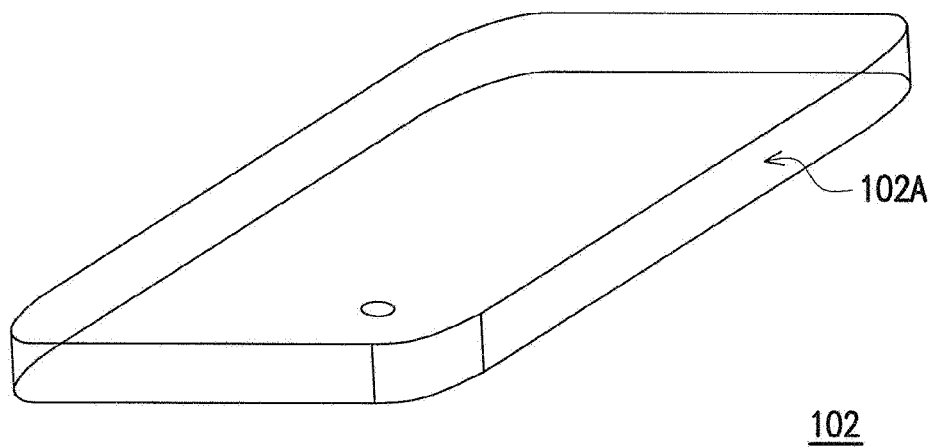

Under the etching process, partial outer surface of the rigid substrate parison 100 in contact with the etching medium such as the cutting wall 100A is eroded, and thus the cracks thereon can be altered. For example, the cracks with both inhomogeneous distribution and sizes on the cutting wall 100A may be changed into a state of having more homogeneous distribution and sizes by the effect of etching medium. Therefore, the resist film 20 is removed after the etching process, and then a rigid substrate 102 with desirable mechanical strength, as illustrated in FIG. 4, may be obtained by performing an ion strengthening process to the rigid substrate parison 100. The ion strengthening process, herein, may be an ion strengthening process already been utilized in the application of strengthening glass plate, such as wholly contacting the rigid substrate parison 100, which is not attached with other film layer, with an ion strengthening solution. Namely, the rigid substrate parison 100, which is not attached with other film layer, is wholly soaked in the ion strengthening solution.

Figure 7:
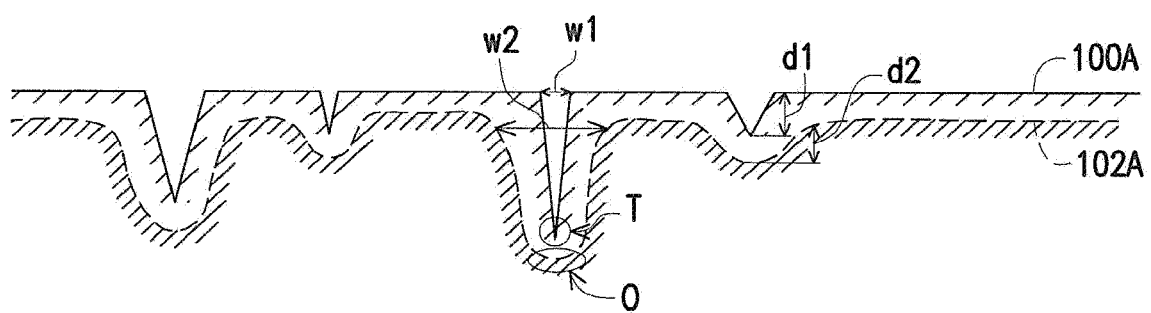
FIG. 7 schematically illustrates a sectional structure of a cutting wall 100A and an etched wall 102A of the rigid substrate.

Referring to FIG. 4, the rigid substrate 102 has an etched wall 102A; furthermore, although it is not particularly illustrated in FIG. 4, the entire outer surface of the rigid substrate 102 is sustainably completely covered with the ion strengthened surface layer. In addition, an average depth of the ion strengthened surface layer on the etched wall 102A is substantially equivalent to an average depth of the ion strengthened surface layer outside of the etched wall 102A. In an embodiment, the etched wall 102A may include a plurality of cracks (as shown in FIG. 7), and the average depth of the ion strengthened surface layer is substantially greater than an average depth of the cracks. The definition and the measurement method of depths of the ion strengthened surface layer are provided in the above descriptions, and thus are not repeated herein.

Figure 3:
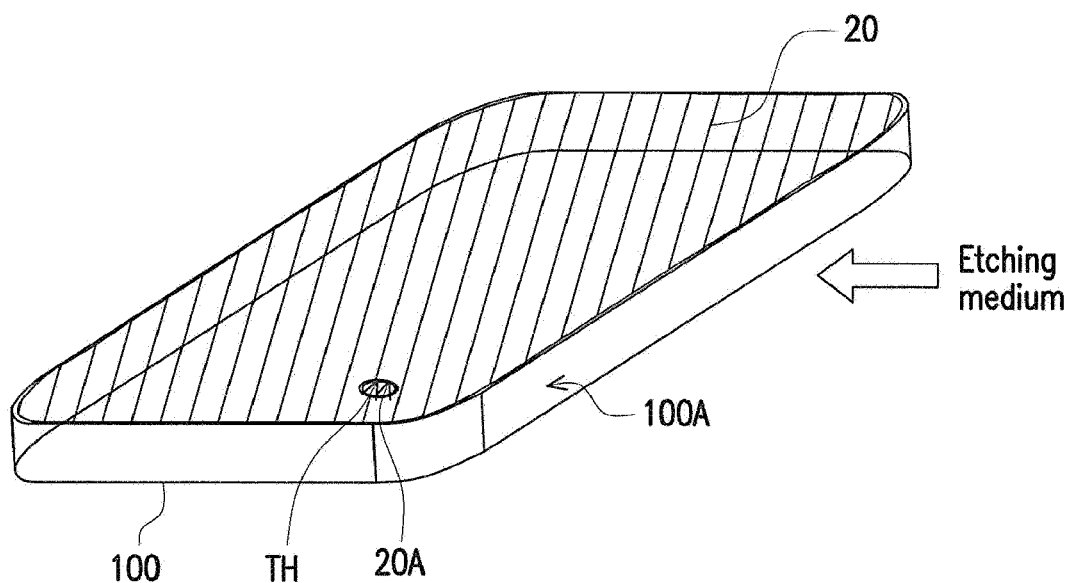
Figure 5:
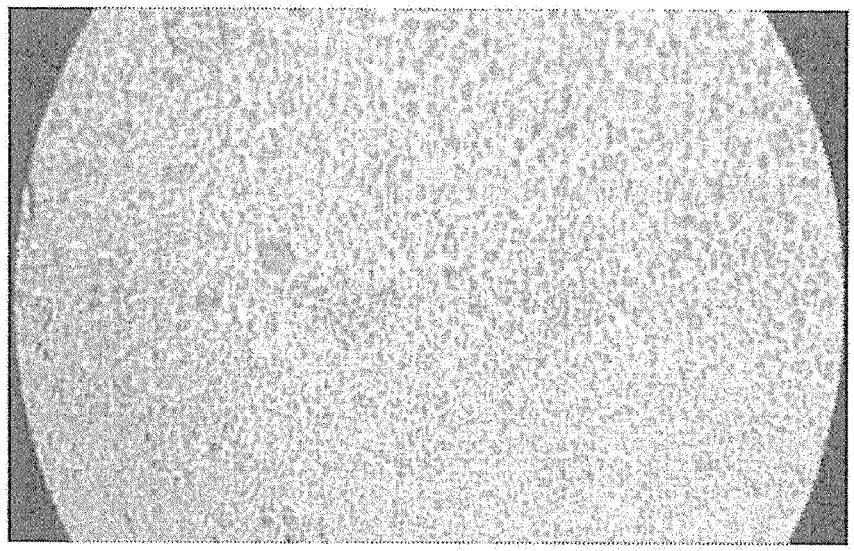
FIG. 5 and FIG. 6 are respectively sample states of a cutting wall 100A and an etched wall 102A under a microscope with 50 times magnification.
Figure 6:
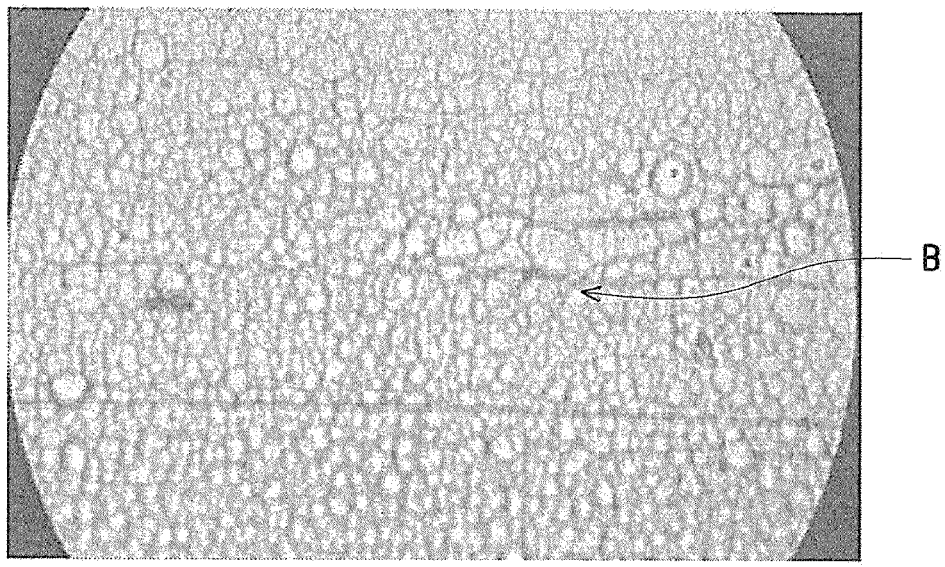

Differences between the etched wall 102A and the cutting wall 100A in FIG. 3 include: an average surface roughness of the cutting wall 100 ranges from 1.0 μm to 3.0 μm, while an average surface roughness of the etched wall 102A ranges from 0.03 μm to 0.8 μm. Moreover, FIG. 5 and FIG. 6 are respectively sample states of a cutting wall 100A and an etched wall 102A under a microscope with 50 times magnification. By referring to both FIG. 5 and FIG. 6, it is able to know that the surface homogeneity of the cutting wall 100A is relatively poor (inhomogeneous cracks distribution) while the surface homogeneity of etched wall 102A is relatively better (more homogeneous cracks distribution). In addition, as shown in FIG. 6, the etched wall 102A includes a plurality of cracks B, and aperture sizes of the cracks B range from 3 μm to 15 μm. According to the structure described above, the rigid substrate 102 with the etched wall 102A, in relative to the rigid substrate parison 100 with the cutting wall 100A, is less likely to occur a stress concentration phenomenon.

For example, FIG. 7 schematically illustrates a sectional structure of a cutting wall 100A and an etched wall 102A of the rigid substrate. Referring to FIG. 7, in the process of mechanical or material removal processing, the outer surface of the cutting wall 100A is directly under the impact of the cutting tools, the grinding particles and so forth; and therefore, many cracks with different sizes are presented in the cross-sectional structure of the cutting wall 100A. However, under the effect of etchant, the outer surface of the etched wall 102A, in relative to the outer surface of the cutting wall 100A, is relatively indented. Therefore, in addition to a reduction in a depth d2 of the cracks (in relative to a depth d1 of the cracks), a tip T of an originally sharp crack may further be altered to be relatively smooth (e.g., a tip O of the cracks), and an original size W1 of the cracks is also correspondingly enlarged (e.g., an size W2 of the cracks).

According to Griffith's theory, the greater (the smoother) the radius curvatures of the tips T, O of the cracks, the smaller the stress concentration effect. Therefore, the present embodiment provides a method to perform an etching process after the cutting process so as to transfer the cutting wall 100A with relatively poor homogeneity into the etched wall 102A with relatively better homogeneity, and thus is helpful in reducing a probability of damaging the rigid substrate 102 due to occurrences of the stress concentration. Moreover, the processing method of the present embodiment further includes performing the ion strengthening process after the etched wall 102A is formed, and thus may further enhance the mechanical strength of the rigid substrate 102.

In overall, it does not matter whether the process conditions of cutting process are subjected to a strict control in order to prevent the generation of cracks, contacting the etchant with the cutting wall 100A after the cutting process still facilitates in reducing the original depths of the cracks on the cutting wall 100A, so that the cracks become more flat and the etched wall 102A with relatively higher homogeneity can be formed. Consequently, the processed rigid substrate 102 in respective to the mechanical strength may be superior to the rigid substrate parison 100. Therefore, in the aforementioned processing steps, in addition to the ion strengthening process, etching effect of the etchant may also enables the strength of the rigid substrate parison 100 after cut-off to be further strengthened, and thus facilitates in the enhancement of a production yield of the rigid substrate 102. For example, when measuring the mechanical strength of the rigid substrate 102 with a destructive test, a passing rate of the rigid substrate 102 may be relatively higher than the rigid substrate parison 100.

Figure 8:
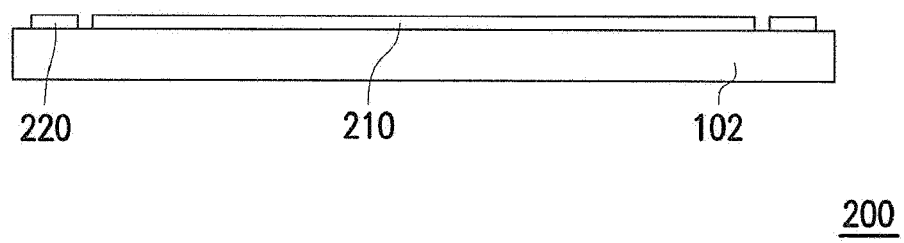
FIG. 8 schematically illustrates a touch panel according to an embodiment.

FIG. 8 schematically illustrates a touch panel according to an embodiment. Referring FIG. 8, in the present embodiment, a touch device 210 can be directly fabricated on the rigid substrate 102 processed with the aforementioned steps so as to constitute a touch panel 200. Moreover, a decoration pattern layer 220 may also be disposed on the rigid substrate 102, and the decoration pattern layer 220 may be located at the periphery of the touch device 210. In practice, the touch device 210 may extend to climb the decoration pattern layer 220. The decoration pattern layer 220 may be, as shown in FIG. 8, selectively located at a side of the rigid substrate 102 where the touch device 210 is. However, in other embodiments, the touch device 210 and the decoration pattern layer 220 may be separately located at two opposite sides of the rigid substrate 102. A material of the decoration pattern layer 220 may be ink, diamond-like carbon, ceramic material, or so forth.

In the steps illustrated in FIG. 1 to FIG. 4, the rigid substrate 102 has been cut into the desired size and shape. Therefore, the manufacturing method of the touch panel 200 may include forming the touch device 210 directly on the rigid substrate 102. In addition, no further cutting is necessary after the manufacture of the touch device 210, and thus is helpful for avoiding a reduction in the mechanical strength of the touch panel 200 due to the additional segmentation step. Moreover, in order to mass produce needs or in order to reduce equipment costs, multiple rigid substrates 102 may further be selectively attached onto an auxiliary carrier board (not shown), and then simultaneously manufacture the corresponding touch devices 210 on the rigid substrates 102 through utilizing a bearing of the auxiliary carrier board. Accordingly, multiple touch panels 200 may be manufactured in a single manufacturing process.

Since the rigid substrate 102 has the ideal mechanical strength, the touch panel 200 is able to have a favorable quality without having an additional protective cover. Therefore, the touch panel 200 may be utilizes as an outmost component of an electronic device without requiring a protection from other component.

Figure 9:
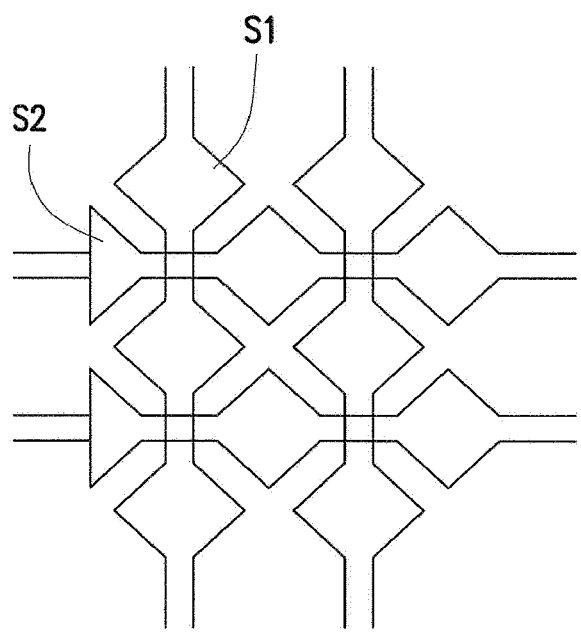
FIG. 9 to FIG. 11 schematically illustrate several touch devices in accordance with several embodiments.
Figure 10:
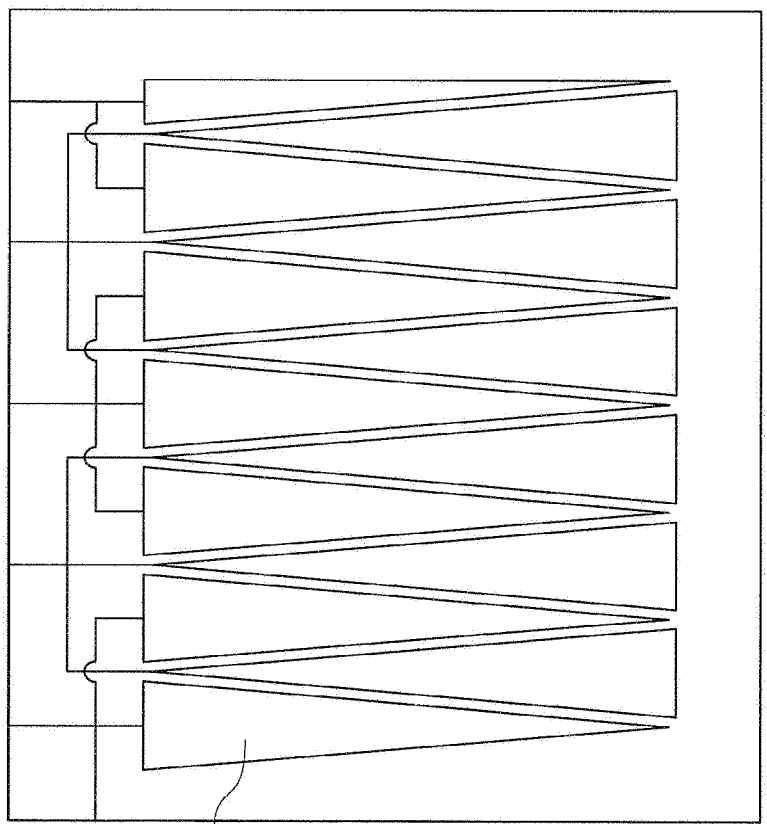
Figure 11:
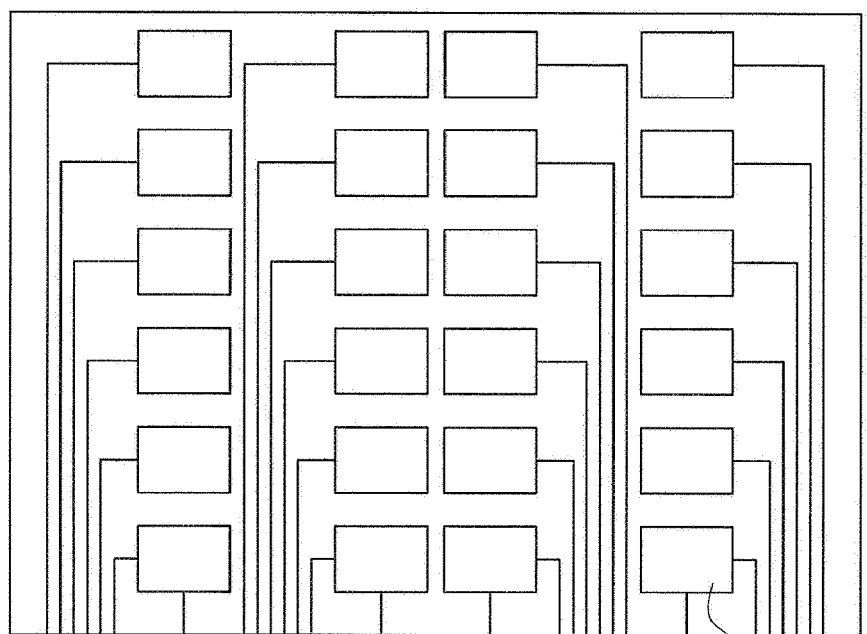

In addition, the touch device 210 may be constituted of a single sensing electrode layer or a plurality of sensing electrode layers, and the touch device 210 may be realized with multiple designs. For example, the touch device 210 may be constituted of a plurality of first sensing serials S1 and a plurality of second sensing serials S2 illustrated in FIG. 9; or, the touch device 210 may be constituted of a plurality of strip-shaped electrodes S3 illustrated in FIG. 10, wherein a width of each strip-shaped electrode S3 gradually decreases from one end to another end. Certainly, the touch device 210 may also be constituted of a plurality of rectangular electrodes S4 illustrated in FIG. 11. All types of design of the touch device 210 mentioned above are only provided as examples for the illustration purpose, and the embodiments of the touch device 210 are not limited thereto.

In summary, the wall (viz., cutting wall) of the rigid substrate after cut-off is etched with the etchant according to the embodiments. Therefore, the rigid substrate has the etched wall, wherein the etched wall, relative to the cutting wall, has better homogeneity. Therefore, the ion strengthened etched wall is less likely to produce the stress concentration phenomenon, and is helpful in enhancing the mechanical strength of the rigid substrate, such as an anti-bending strength. Because qualities of different mechanical or material removal processes may have differences, the resulting depths of the cracks are inconsistent, and thus an achievable effect after being ion strengthened is influenced. However, in the embodiments, a chemical (ion) strengthening is performed after the mechanical or material removal processed rigid substrate is being partially etched, so that the cracks may be ensured to be substantially covering by the ion strengthened surface layer. Herein, a corresponding compressive stress distribution layer may be derived from the ion strengthened surface layer, and a compressive stress distribution layer may limit the crack growths on the glass surface so as to enhance the strength of the glass substrate undergoing damage, and thus enables a much stable product strength.

Consequently, the touch panel manufactured with the aforementioned rigid substrate may have ideal mechanical strength, and favorable quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A processing method of a substrate comprising:
    performing a mechanical or material removal processing to a motherboard to form at least one substrate parison, wherein a cutting wall is defined on the substrate parison due to the mechanical or material removal processing;
    performing a chemical etching process on the cutting wall so that the cutting wall becomes an etched wall, wherein the etched wall comprises a plurality of cracks, each of the cracks of the etched wall has an aperture size ranging from 3 µm to 15 µm, an average surface roughness of the cutting wall ranges from 1.0 µm to 3 µm, and an average surface roughness of the etched wall ranges from 0.03 µm to 0.8 µm, a depth of the cracks of the etched wall is smaller than a depth of cracks of the cutting wall, and the chemical etching process comprises:
        attaching a resistant layer onto the substrate parison and enabling the resistant layer to expose a part of the cutting wall;
        contacting the exposed part of the cutting wall with an etchant to form the etched wall from the cutting wall; and
        removing the resistant layer; and
    performing a one-time ion strengthening process after removing the resistant layer so that an entire outer surface of the substrate parison completely comprises an ion strengthened surface layer to form the substrate, wherein an average depth of the ion strengthened surface layer on the etched wall is substantially equivalent to an average depth of the ion strengthened surface layer outside of the etched wall, and the average depth of the ion strengthened surface layer is substantially greater than an average depth of the cracks of the etched wall.

2. The processing method of the substrate as claimed in claim 1, wherein a material of the substrate parison is glass, and a material of the etchant is hydrofluoric acid.

3. The processing method of the substrate as claimed in claim 1, wherein performing the one-time ion strengthening process comprises wholly contacting the substrate with an ion strengthening liquid.

4. The processing method of the substrate as claimed in claim 1, wherein the mechanical or material removal processing comprises at least one of cutting, grinding, hole boring, chamfering, patterned etching, or a polishing process.

5. The processing method of the substrate as claimed in claim 1, wherein the chemical etching process is performed with a dry etching medium comprising a fluorine-containing gas or a plasma.

6. The processing method of the substrate as claimed in claim 1, wherein the substrate has a grinded rounding or an arc-shaped upper surface.

7. A processing method of forming a touch panel, comprising:
    forming a substrate comprising:
        performing a mechanical or material removal processing to a motherboard to form at least one substrate parison, wherein a cutting wall is defined on the substrate parison due to the mechanical or material removal processing;
        performing a chemical etching process on the cutting wall so that the cutting wall becomes an etched wall, wherein the etched wall comprises a plurality of cracks, each of the cracks of the etched wall has an aperture size ranging from 3 µm to 15 µm, an average surface roughness of the cutting wall ranges from 1.0 µm to 3 µm, and an average surface roughness of the etched wall ranges from 0.03 µm to 0.8 µm, a depth of the cracks of the etched wall is smaller than a depth of cracks of the cutting wall, and the chemical etching process comprises:
            attaching a resistant layer onto the substrate parison and enabling the resistant layer to expose a part of the cutting wall;
            contacting the exposed part of the cutting wall with an etchant to form the etched wall from the cutting wall; and
            removing the resistant layer; and
        performing a one-time ion strengthening process after removing the resistant layer so that an entire outer surface of the substrate parison completely comprises an ion strengthened surface layer to form the substrate, wherein an average depth of the ion strengthened surface layer on the etched wall is substantially equivalent to an average depth of the ion strengthened surface layer outside of the etched wall, and the average depth of the ion strengthened surface layer is substantially greater than an average depth of the cracks of the etched wall; and
    forming a touch device on the substrate.

8. The processing method of forming the touch panel as claimed in claim 7, wherein the touch device comprises a single sensing electrode layer or a plurality of sensing electrode layers.

9. The processing method of forming the touch panel as claimed in claim 7, wherein the touch device comprises a plurality of first sensing serials and a plurality of second sensing serials.

10. The processing method of forming the touch panel as claimed in claim 7, wherein the touch device comprises a plurality of strip-shaped electrodes, and a width of each strip-shaped electrode of the plurality of strip-shaped electrodes gradually decreases from one end to another.

11. The processing method of forming the touch panel as claimed in claim 7, wherein the touch device comprises a plurality of rectangular electrodes.

12. The processing method of forming the touch panel as claimed in claim 7, wherein the touch device is directly fabricated on the substrate.

13. The processing method of forming the touch panel as claimed in claim 7, wherein the substrate has a grinded rounding or an arc-shaped upper surface.

14. The method of claim 1, comprising:
    forming a through hole in the substrate parison, wherein:
        the resistant layer defines an opening,
        attaching the resistant layer onto the substrate parison comprises aligning the opening with the through hole such that the through hole remains exposed after attaching the resistant layer onto the substrate parison, the substrate parison comprises a top surface and a sidewall, the sidewall corresponds to the cutting wall, and attaching the resistant layer onto the substrate parison comprises attaching the resistant layer over the top surface to conceal a first portion of the top surface.

15. The method of claim 1, wherein the etchant erodes a portion of the cutting wall.

16. The method of claim 1, wherein:

the substrate parison comprises a top surface and a sidewall, the sidewall corresponds to the cutting wall, attaching the resistant layer onto the substrate parison comprises attaching the resistant layer over the top surface to conceal a first portion of the top surface, and the sidewall and a second portion of the top surface remain exposed after attaching the resistant layer onto the substrate parison.

17. The method of claim 1, wherein:

performing the one-time ion strengthening process comprises diffusing potassium ions into the substrate parison, a first portion of the substrate parison has a first concentration of the potassium ions after diffusing the potassium ions into the substrate parison, a second portion of the substrate parison has a second concentration of the potassium ions after diffusing the potassium ions into the substrate parison, and the first concentration is different than the second concentration.

18. A processing method of a substrate comprising:

performing a mechanical or material removal processing to a motherboard to form at least one substrate parison, wherein a cutting wall is defined on the substrate parison due to the mechanical or material removal processing;

forming a through hole in the substrate parison;

performing an etching process on the cutting wall so that the cutting wall becomes an etched wall, wherein the etched wall comprises a plurality of cracks, each of the cracks of the etched wall has an aperture size ranging from 3 µm to 15 µm, an average surface roughness of the cutting wall ranges from 1.0 µm to 3 µm, and an average surface roughness of the etched wall ranges from 0.03 µm to 0.8 µm, a depth of the cracks of the etched wall is smaller than a depth of cracks of the cutting wall, and the etching process comprises:

attaching a resistant layer defining an opening onto the substrate parison, wherein the opening is aligned with the through hole such that the through hole remains exposed through the resistant layer and a part of the cutting wall is exposed by the resistant layer;

contacting the exposed part of the cutting wall with an etchant to form the etched wall from the cutting wall; and removing the resistant layer; and performing a one-time ion strengthening process after removing the resistant layer so that an entire outer surface of the substrate parison completely comprises an ion strengthened surface layer to form the substrate, wherein an average depth of the ion strengthened surface layer on the etched wall is substantially equivalent to an average depth of the ion strengthened surface layer outside of the etched wall, and the average depth of the ion strengthened surface layer is substantially greater than an average depth of the cracks of the etched wall.

19. The processing method of the substrate as claimed in claim 18, wherein a material of the substrate parison is glass, and a material of the etchant is hydrofluoric acid.

20. The processing method of the substrate as claimed in claim 18, wherein the etching process is performed with a dry etching medium comprising a fluorine-containing gas or a plasma.

* * * * *